United States Patent
Hashimoto et al.

(10) Patent No.: US 11,001,001 B2
(45) Date of Patent: May 11, 2021

(54) THREE-DIMENSIONAL SHAPING APPARATUS AND THREE-DIMENSIONAL SHAPED ARTICLE PRODUCTION METHOD

(71) Applicant: SEIKO EPSON CORPORATION, Tokyo (JP)

(72) Inventors: Taki Hashimoto, Shiojiri (JP); Kohei Yuwaki, Tsukuba (JP); Koichi Saito, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/719,192

(22) Filed: Dec. 18, 2019

(65) Prior Publication Data

US 2020/0198240 A1    Jun. 25, 2020

(30) Foreign Application Priority Data

Dec. 21, 2018 (JP) .............................. JP2018-239257

(51) Int. Cl.
*B29C 64/321* (2017.01)
*B33Y 10/00* (2015.01)
*B33Y 40/00* (2020.01)
*B33Y 50/02* (2015.01)
*B29C 64/393* (2017.01)
*B22D 23/00* (2006.01)
*B28B 1/00* (2006.01)
*B28B 17/00* (2006.01)
(Continued)

(52) U.S. Cl.
CPC .......... *B29C 64/321* (2017.08); *B22D 23/003* (2013.01); *B28B 1/001* (2013.01);
(Continued)

(58) Field of Classification Search
CPC . B29C 64/106; B29C 48/2528; B29C 64/343; B29C 48/30; B29C 48/00;
(Continued)

(56) References Cited

U.S. PATENT DOCUMENTS

| | | | | |
|---|---|---|---|---|
| 4,107,246 A | * | 8/1978 | LaSpisa | G05D 7/0605 |
| | | | | 264/40.7 |
| 5,633,021 A | * | 5/1997 | Brown | B29C 64/40 |
| | | | | 425/375 |

(Continued)

FOREIGN PATENT DOCUMENTS

| | | |
|---|---|---|
| CN | 04772906 B | 7/2015 |
| EP | 2772347 A1 * | 9/2014 .......... B29C 64/106 |

(Continued)

*Primary Examiner* — Joseph S Del Sole
*Assistant Examiner* — Margaret B Hayes
(74) *Attorney, Agent, or Firm* — Chip Law Group

(57) ABSTRACT

A three-dimensional shaping apparatus includes a material melting portion melting a material to form a shaping material, a supply channel through which the shaping material flows, a rotator that is configured to rotate around a rotation axis and that has a first nozzle configured to communicate with the supply channel and a second nozzle configured to communicate with the supply channel, a flow rate regulating mechanism that is provided in the supply channel and that regulates a flow rate of the shaping material to be supplied to the first nozzle or the second nozzle, and a controller controlling the flow rate regulating mechanism and the rotator so as to eject the shaping material to a table from the first nozzle or the second nozzle, thereby shaping a three-dimensional shaped article, wherein the controller controls rotation of the rotator so as to switch between a first state where the supply channel and the first nozzle communicate with each other and a second state where the supply channel and the second nozzle communicate with each other, and in the first state, the second nozzle is located at a position more (Continued)

distant from the table than the first nozzle, and in the second state, the first nozzle is located at a position more distant from the table than the second nozzle.

8 Claims, 9 Drawing Sheets

(51) Int. Cl.
  *B29C 64/118* (2017.01)
  *B33Y 30/00* (2015.01)
(52) U.S. Cl.
  CPC ........ *B28B 17/0081* (2013.01); *B29C 64/118* (2017.08); *B29C 64/393* (2017.08); *B33Y 10/00* (2014.12); *B33Y 40/00* (2014.12); *B33Y 50/02* (2014.12); *B33Y 30/00* (2014.12)
(58) Field of Classification Search
  CPC ......... B29C 48/92; B29C 48/02; B29C 64/20; B29C 64/321; B29C 64/118; B29C 64/209; B29C 45/27; B33Y 50/02; B33Y 10/00; B33Y 30/00; B33Y 40/00; B29B 7/248

See application file for complete search history.

(56) References Cited

U.S. PATENT DOCUMENTS

| | | | |
|---|---|---|---|
| 6,019,916 A * | 2/2000 | Mizuguchi | B29C 48/2554 264/39 |
| 8,961,167 B2 * | 2/2015 | Swanson | B29C 64/112 425/375 |
| 2014/0291886 A1 * | 10/2014 | Mark | B29C 69/001 264/163 |
| 2016/0009010 A1 * | 1/2016 | Kariya | B29B 7/248 264/328.18 |
| 2016/0046073 A1 * | 2/2016 | Hadas | B29C 64/241 264/211.21 |
| 2017/0157828 A1 * | 6/2017 | Mandel | B29C 64/343 |
| 2017/0182701 A1 * | 6/2017 | Ryan | B29C 64/106 |
| 2017/0210069 A1 * | 7/2017 | Stubenruss | B29C 64/118 |
| 2018/0117834 A1 | 5/2018 | Murao | |

FOREIGN PATENT DOCUMENTS

| | | | | |
|---|---|---|---|---|
| EP | 3581365 A1 * | 12/2019 | .......... | B29C 64/112 |
| FR | 3024958 A1 * | 2/2016 | .......... | B29C 64/118 |
| JP | 2006-192710 A | 7/2006 | | |
| JP | 2009137260 A1 * | 6/2009 | | |
| JP | 2016-068410 A | 5/2016 | | |
| JP | 2018-075825 A | 5/2018 | | |
| WO | WO-2018158239 A1 * | 9/2018 | .......... | B29C 64/118 |

* cited by examiner

THREE-DIMENSIONAL SHAPING APPARATUS AND THREE-DIMENSIONAL SHAPED ARTICLE PRODUCTION METHOD

The present application is based on, and claims priority from JP Application Serial Number 2018-239257, filed on Dec. 21, 2018, the disclosure of which is hereby incorporated by reference herein in its entirety.

BACKGROUND

1. Technical Field

The present disclosure relates to a three-dimensional shaping apparatus and a three-dimensional shaped article production method.

2. Related Art

JP-A-2006-192710 (Patent Document 1) discloses a technique for shaping a three-dimensional object by extruding a thermoplastic material melted by heating in a preheater in a specific region on a base from an extrusion nozzle scanning according to preset shape data, and further stacking a molten material on the material cured on the base.

The inventors of the present application provided a plurality of nozzles in a three-dimensional shaping apparatus and studied whether a shaped article is efficiently shaped using these nozzles. However, the inventors of the present application found a problem that when the nozzles move, an unused nozzle may interfere with the shaped article to affect shaping accuracy.

SUMMARY

An advantage of some aspects of the present disclosure is to provide a technique for suppressing interference of an unused nozzle with a shaped article in a three-dimensional shaping apparatus including a plurality of nozzles.

According to an aspect of the present disclosure, a three-dimensional shaping apparatus is provided. This three-dimensional shaping apparatus includes a material melting portion melting a material to form a shaping material, a supply channel through which the shaping material flows, a rotator that is configured to rotate around a rotation axis and that has a first nozzle configured to communicate with the supply channel and a second nozzle configured to communicate with the supply channel, a flow rate regulating mechanism that is provided in the supply channel and that regulates a flow rate of the shaping material to be supplied to the first nozzle or the second nozzle, and a controller controlling the flow rate regulating mechanism and the rotator so as to eject the shaping material to a table from the first nozzle or the second nozzle, thereby shaping a three-dimensional shaped article, wherein the controller controls rotation of the rotator so as to switch between a first state where the supply channel and the first nozzle communicate with each other and the supply channel and the second nozzle are shut off from each other and a second state where the supply channel and the second nozzle communicate with each other and the supply channel and the first nozzle are shut off from each other, and in the first state, the second nozzle is located at a position more distant from the table than the first nozzle, and in the second state, the first nozzle is located at a position more distant from the table than the second nozzle.

DESCRIPTION OF EXEMPLARY EMBODIMENTS

A. First Embodiment

Figure 1:
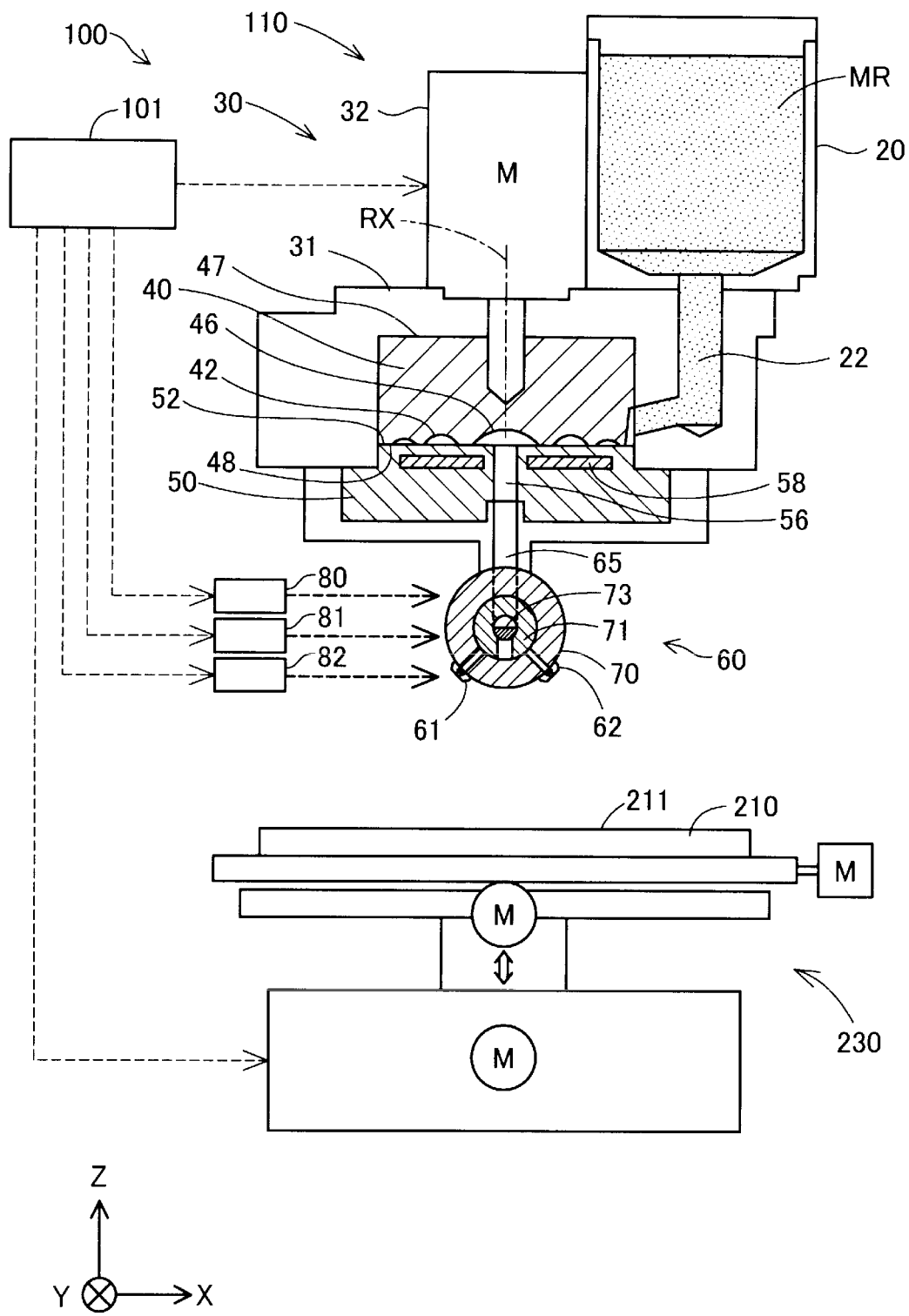
FIG. 1 is an explanatory view showing a schematic configuration of a three-dimensional shaping apparatus in a first embodiment.

FIG. 1 is an explanatory view showing a schematic configuration of a three-dimensional shaping apparatus 100 in a first embodiment. In FIG. 1, arrows along the X, Y, and Z directions orthogonal to one another are shown. The X direction and the Y direction are directions along the horizontal direction, and the Z direction is an upward vertical direction. In also the other drawings, arrows along the X, Y, and Z directions are shown as appropriate. The X, Y, and Z directions in FIG. 1 and the X, Y, and Z directions in the other drawings indicate the same directions.

The three-dimensional shaping apparatus 100 includes a controller 101, a shaping portion 110 forming and ejecting a shaping material, a table 210 for use in shaping to serve as a base of a three-dimensional shaped article, and a moving mechanism 230 controlling an ejection position of the shaping material.

The controller 101 controls the operation of the entire three-dimensional shaping apparatus 100 and executes a shaping process for shaping a three-dimensional shaped article. The controller 101 is constituted by a computer including one or a plurality of processors and a main storage device. The controller 101 exhibits various functions by execution of a program read on the main storage device by the processor. Apart of the functions of the controller 101 may be realized by a hardware circuit. In the shaping process executed by the controller 101, the shaping portion 110 and the moving mechanism 230 are controlled according to shaping data of the three-dimensional shaped article.

The shaping portion 110 ejects a molten shaping material in a paste form at a target position on the table 210 under the control of the controller 101. The shaping portion 110 includes a material supply portion 20 serving as a supply source of a material MR before being converted into the shaping material, a material melting portion 30 melting the material MR to form the shaping material, and a nozzle unit 60 including a first nozzle 61 and a second nozzle 62 ejecting the shaping material to the table 210.

The material supply portion 20 supplies the material MR for forming the shaping material to the material melting portion 30. The material supply portion 20 is constituted by, for example, a hopper housing the material MR. The material supply portion 20 is coupled to the material melting portion 30 through a communication path 22. The material MR is fed to the material supply portion 20 in the form of, for example, a pellet, a powder, or the like. A detailed description of the material MR will be given later.

The material melting portion 30 forms the shaping material in a paste form by plasticizing at least a part of the material MR supplied from the material supply portion 20 so as to exhibit fluidity, and guides the shaping material to the nozzle unit 60. The material melting portion 30 includes a screw case 31, a driving motor 32, a flat screw 40, and a screw facing portion 50. The flat screw 40 is also referred to as "scroll". The screw facing portion 50 is also referred to as "barrel". The material melting portion 30 may plasticize the entire material MR, or when the material MR contains a plurality of components, it may plasticize a part of the components.

The flat screw 40 has a substantially columnar shape whose height along a central axis RX thereof is smaller than the diameter thereof. In this embodiment, the flat screw 40 is disposed so that the central axis RX thereof is parallel to the Z direction.

The flat screw 40 is housed in the screw case 31. The flat screw 40 at an upper face 47 side is coupled to the driving motor 32 and is rotated around the central axis RX in the screw case 31 by a rotational driving force generated by the driving motor 32. The driving motor 32 is driven under the control of the controller 101.

A groove portion 42 is formed in a lower face 48 of the flat screw 40. The communication path 22 of the material supply portion 20 described above communicates with the groove portion 42 from a side face of the flat screw 40.

The lower face 48 of the flat screw 40 faces an upper face 52 of the screw facing portion 50. A space is formed between the groove portion 42 in the lower face 48 of the flat screw 40 and the upper face 52 of the screw facing portion 50. In this space, the material MR is supplied from the material supply portion 20. Specific configurations of the flat screw 40 and the groove portion 42 will be described later.

In the screw facing portion 50, a heater 58 for heating the material MR is embedded. The material MR supplied to the groove portion 42 of the flat screw 40 flows along the groove portion 42 by rotation of the flat screw 40 while being melted in the groove portion 42 and is guided to a central portion 46 of the flat screw 40 as the shaping material. The shaping material in a paste form flowing into the central portion 46 is supplied to the nozzle unit 60 through a communication hole 56 provided at the center of the screw facing portion 50. In the shaping material, it is not necessary that all types of substances constituting the shaping material be melted. It is sufficient to convert the shaping material into a state having fluidity as a whole by melting at least some types of substances among the substances constituting the shaping material.

The nozzle unit 60 is coupled to the communication hole 56 of the screw facing portion 50 through a supply channel 65. The nozzle unit 60 ejects the shaping material formed in the material melting portion 30 toward the table 210 from the first nozzle 61 or the second nozzle 62. In this embodiment, the supply channel 65 extends along the vertical direction, and the nozzle unit 60 is provided in a lower part of the material melting portion 30. A detailed configuration of the nozzle unit 60 will be described later.

The table 210 is disposed at a position opposed to the nozzle unit 60 in the Z direction. In this embodiment, an upper face 211 of the table 210 opposed to the nozzle unit 60 is disposed horizontally, that is, parallel to the X and Y directions.

The moving mechanism 230 is configured to be able to change a relative position of the table 210 and the nozzle unit 60. In this embodiment, the position of the nozzle unit 60 is fixed, and the moving mechanism 230 moves the table 210. The moving mechanism 230 is constituted by a three-axis positioner for moving the table 210 in three axis directions of the X, Y, and Z directions by driving forces of three motors. The moving mechanism 230 changes a relative positional relationship of the nozzle unit 60 and the table 210 under the control of the controller 101.

In another embodiment, in place of the configuration in which the table 210 is moved by the moving mechanism 230, a configuration in which the moving mechanism 230 moves the nozzle unit 60 with respect to the table 210 in a state where the position of the table 210 is fixed may be adopted. In addition, a configuration in which the table 210 is moved in the Z direction and the nozzle unit 60 is moved in the X or Y direction by the moving mechanism 230, or a configuration in which the table 210 is moved in the X or Y direction and the nozzle unit 60 is moved in the Z direction by the moving mechanism 230 may be adopted. Even in such a configuration, the relative positional relationship of the nozzle unit 60 and the table 210 can be changed.

Figure 2:
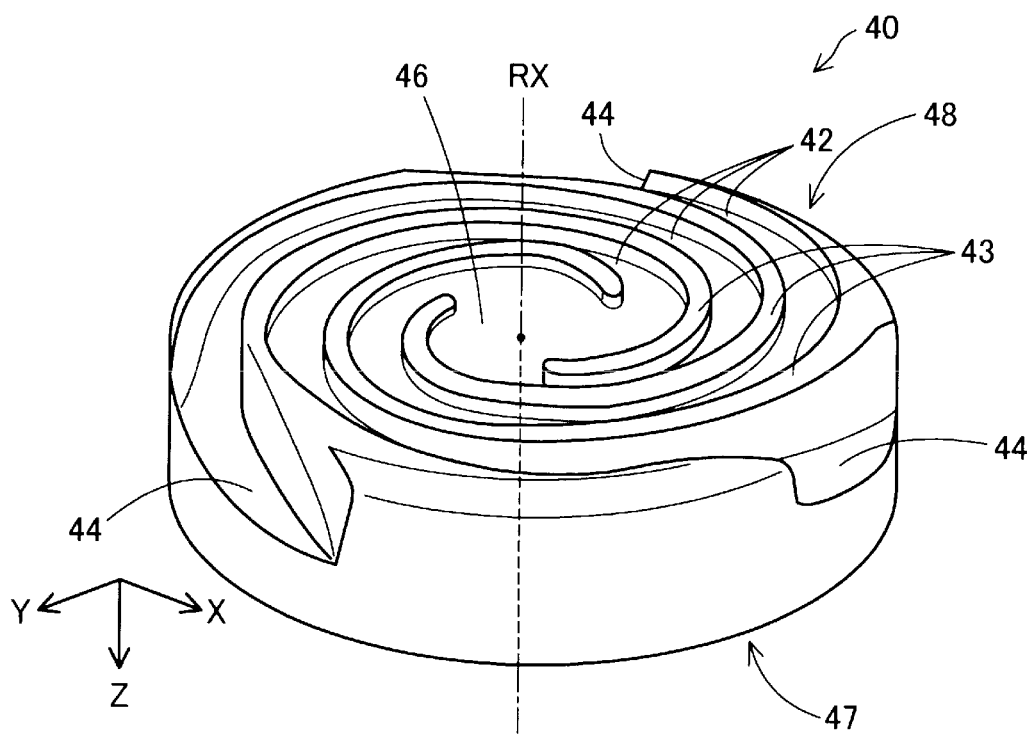
FIG. 2 is a schematic perspective view showing a configuration at a lower face side of a flat screw.

FIG. 2 is a schematic perspective view showing a configuration at the lower face 48 side of the flat screw 40. In FIG. 2, the position of the rotation axis RX of the flat screw 40 is indicated by an alternate long and short dash line. As described with reference to FIG. 1, the groove portion 42 is provided in the lower face 48 of the flat screw 40 opposed to the screw facing portion 50. Hereinafter, the lower face 48 is also referred to as "groove formed face 48".

The central portion 46 of the groove formed face 48 of the flat screw 40 is configured as a recess portion to which one end of the groove portion 42 is coupled. The central portion 46 is opposed to the communication hole 56 of the screw facing portion 50 shown in FIG. 1. In the first embodiment, the central portion 46 crosses the rotation axis RX.

The groove portion 42 of the flat screw 40 constitutes a so-called scroll groove. The groove portion 42 extends in a spiral shape so as to draw an arc toward the outer circumference of the flat screw 40 from the central portion 46. The groove portion 42 may be configured to extend in a helical shape. In the groove formed face 48, a projecting strip portion 43 that constitutes a side wall portion of the groove portion 42 and that extends along each groove portion 42 is provided.

The groove portion 42 continues up to a material flow inlet 44 formed in a side face of the flat screw 40. This material flow inlet 44 is a portion for receiving the material MR supplied through the communication path 22 of the material supply portion 20.

In FIG. 2, an example of the flat screw 40 having three groove portions 42 and three projecting strip portions 43 is shown. The number of groove portions 42 or projecting strip portions 43 provided in the flat screw 40 is not limited to 3. In the flat screw 40, only one groove portion 42 may be provided, or a plurality of (two or more) groove portions 42 may be provided. Further, an arbitrary number of projecting strip portions 43 may be provided according to the number of groove portions 42.

In FIG. 2, an example of the flat screw 40 in which the material flow inlet 44 is formed at three sites is shown. The number of material flow inlets 44 provided in the flat screw 40 is not limited to 3. In the flat screw 40, the material flow inlet 44 may be provided at only one site or may be provided at a plurality of (two or more) sites.

Figure 3:
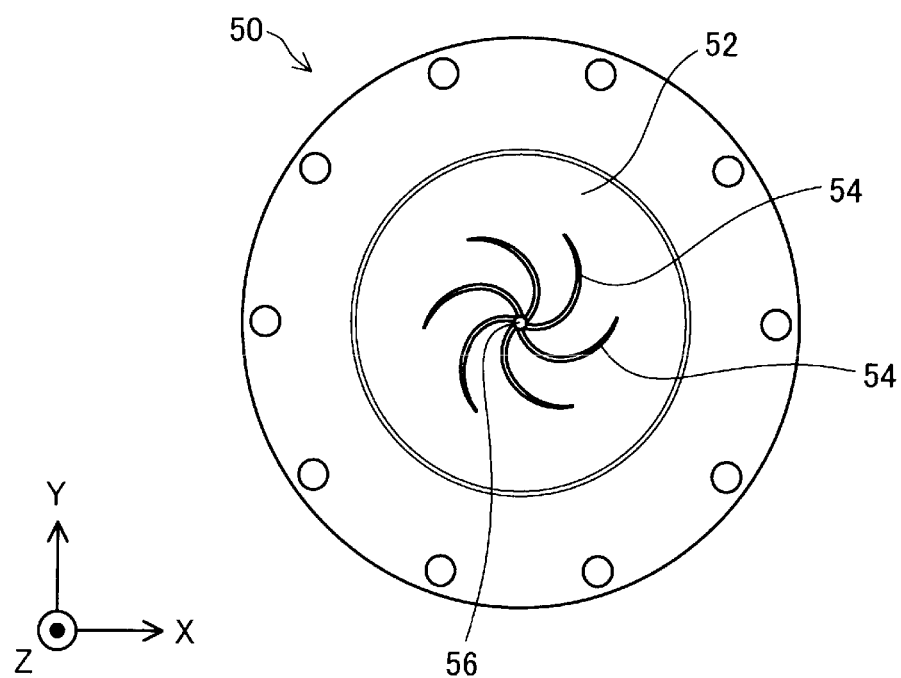
FIG. 3 is a schematic plan view showing an upper face side of a screw facing portion.

FIG. 3 is a schematic plan view showing the upper face 52 side of the screw facing portion 50. The upper face 52 of the screw facing portion 50 is opposed to the groove formed face 48 of the flat screw 40 as described above. Hereinafter, this upper face 52 is also referred to as "screw opposed face 52". At the center of the screw opposed face 52, the above-mentioned communication hole 56 for supplying the shaping material to the nozzle unit 60 is formed.

In the screw opposed face 52, a plurality of guide grooves 54 that are coupled to the communication hole 56 and that extend in a spiral shape toward the outer circumference from the communication hole 56 are formed. The plurality of guide grooves 54 have a function of guiding the shaping material flowing in the central portion 46 of the flat screw 40 to the communication hole 56. As described with reference to FIG. 1, in the screw facing portion 50, the heater 58 is embedded. Melting of the material MR in the material melting portion 30 is realized by heating by the heater 58 and rotation of the flat screw 40.

When the flat screw 40 rotates, the material MR supplied from the material flow inlet 44 is guided to the groove portion 42 and moves toward the central portion 46 while being heated in the groove portion 42. The material MR is melted to increase the fluidity as approaching the central portion 46 and is converted into the shaping material. The shaping material gathered at the central portion 46 flows out to the supply channel 65 from the communication hole 56 due to an internal pressure generated at the central portion 46 and is guided to the nozzle unit 60.

Figure 4:
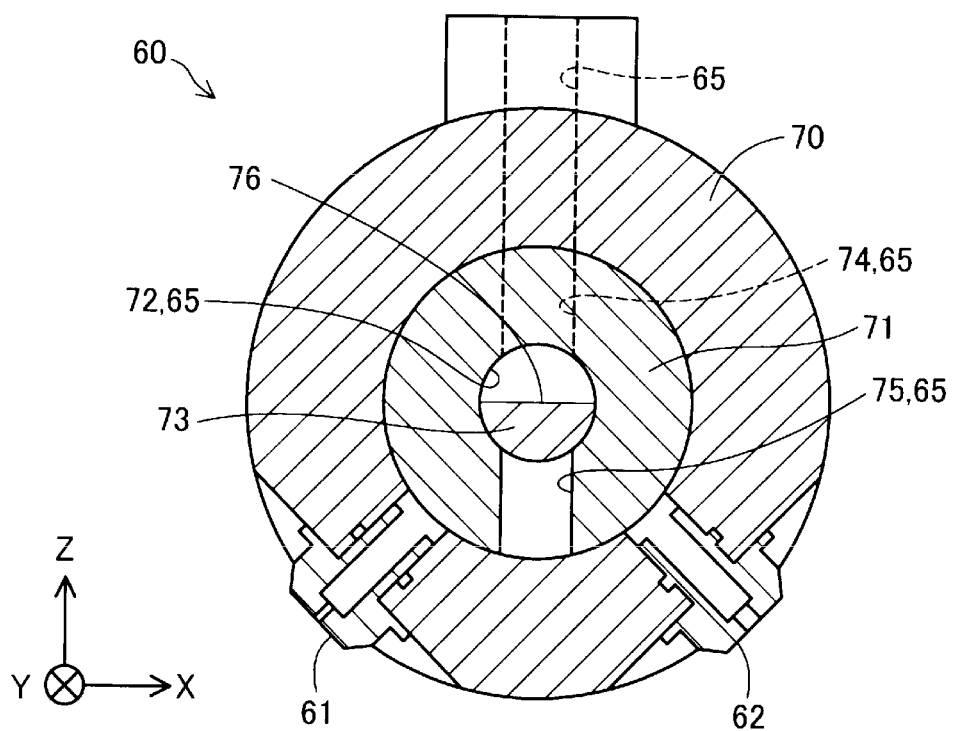
FIG. 4 is a cross-sectional view along an XZ plane of a nozzle unit.
Figure 5:
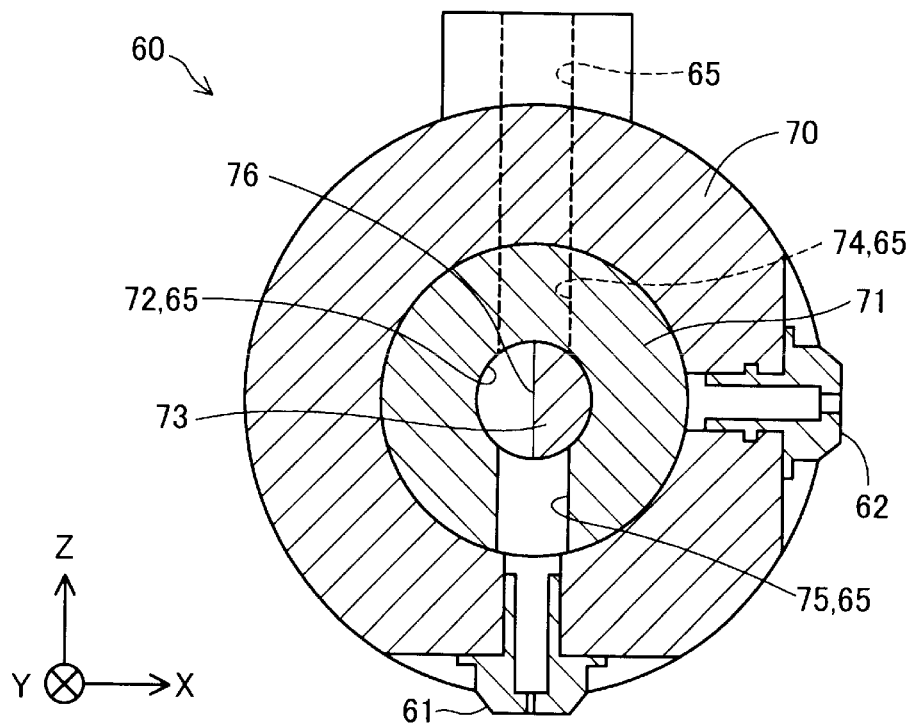
FIG. 5 is a cross-sectional view along the XZ plane of the nozzle unit.
Figure 6:
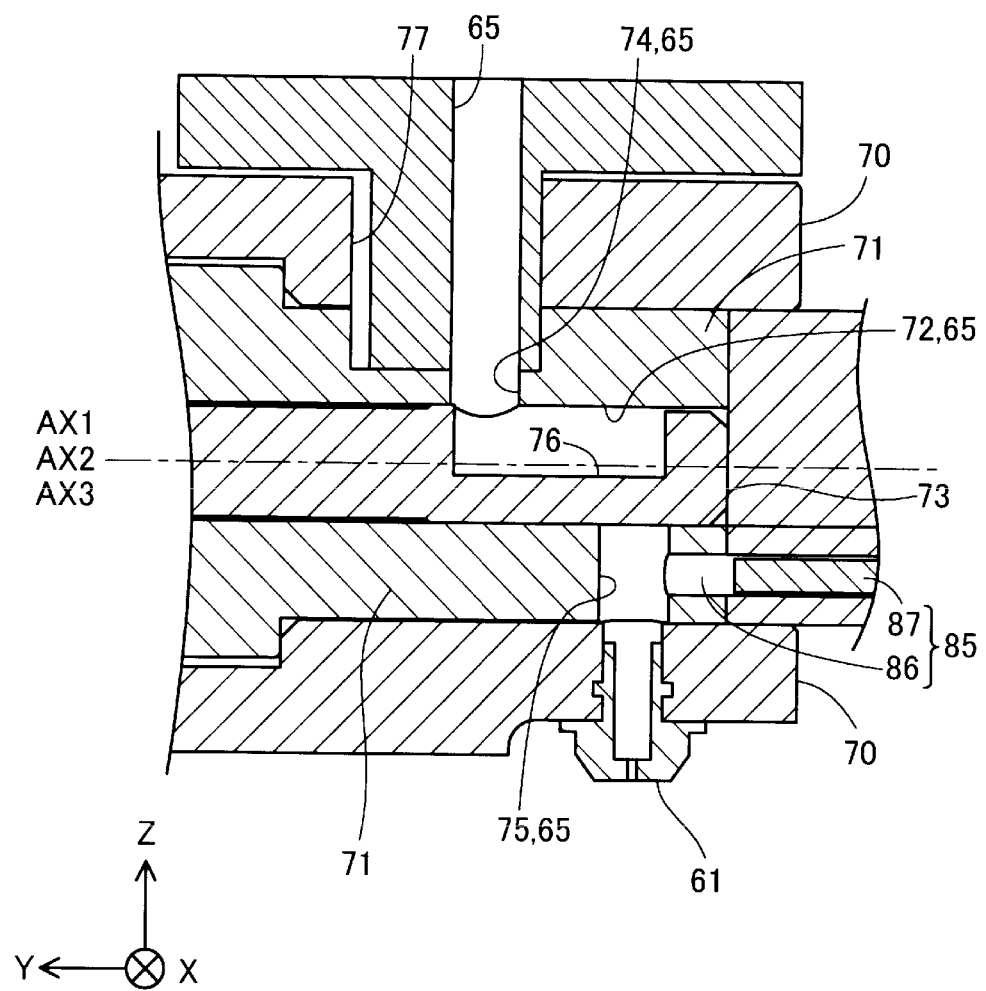
FIG. 6 is a cross-sectional view along a YZ plane of the nozzle unit.
Figure 7:
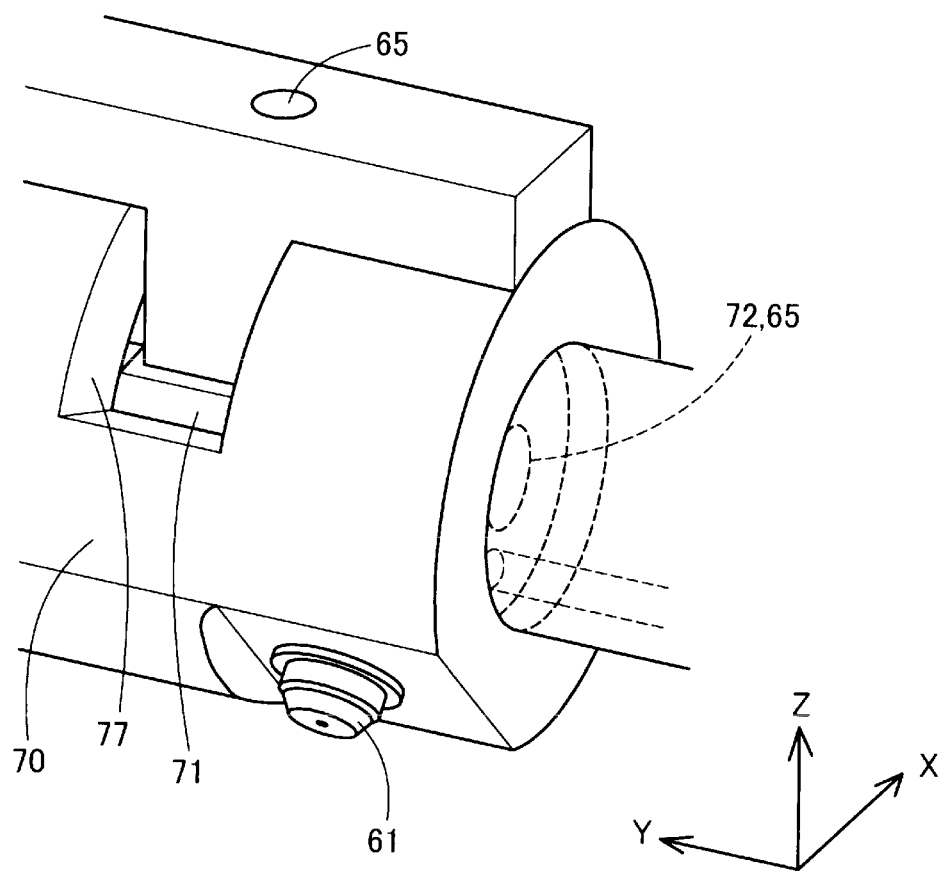
FIG. 7 is an external perspective view of the nozzle unit.

FIGS. 4 and 5 are each a cross-sectional view along the XZ plane of the nozzle unit 60. FIG. 6 is a cross-sectional view along the YZ plane of the nozzle unit 60. FIG. 7 is an external perspective view of the nozzle unit 60. The nozzle unit 60 includes a fixed member 71 in a cylindrical shape fixed to the three-dimensional shaping apparatus 100, a flow rate regulating mechanism 73 disposed in a through-hole 72 passing through the center of the fixed member 71, a rotator 70 in a cylindrical shape disposed so as to surround the outer circumference of the fixed member 71, and a suction portion 85 that is coupled to the supply channel 65 and that sucks the shaping material in the supply channel 65.

As shown in FIGS. 4 to 6, a first opening portion 74 is provided in an upper part of the fixed member 71, and the supply channel 65 is coupled to this first opening portion 74. The first opening portion 74 communicates with the through-hole 72 in the fixed member 71. A second opening portion 75 is provided in a lower part of the fixed member 71. This second opening portion 75 communicates with the through-hole 72 in the fixed member 71. The first opening portion 74, the through-hole 72, and the second opening portion 75 constitute a part of the supply channel 65. The first opening portion 74 and the second opening portion 75 are separated from each other in a direction along a central axis AX1 of the through-hole 72.

The flow rate regulating mechanism 73 is a valve member in a columnar shape. As shown in FIGS. 4 and 5, the flow rate regulating mechanism 73 has a recess portion 76 formed by cutting out a part of the outer circumference of the columnar shape into a semicircular shape. As shown in FIG. 6, the recess portion 76 is formed in a part corresponding to a length from the first opening portion 74 to the second opening portion 75 in the flow rate regulating mechanism 73. One end portion of the flow rate regulating mechanism 73 is coupled to a first driving portion 80 shown in FIG. 1. The first driving portion 80 is constituted by an actuator such as a stepping motor and rotates the flow rate regulating mechanism 73 around a central axis AX2 thereof according to the command from the controller 101. The flow rate regulating mechanism 73 blocks up the second opening portion 75 or regulates the amount of the shaping material flowing from the first opening portion 74 to the second opening portion 75 by being rotated in the through-hole 72 of the fixed member 71 by the first driving portion 80 according to the command from the controller 101. Specifically, as shown in FIG. 4, when the flow rate regulating mechanism 73 rotates so that the recess portion 76 is located at the upper side, the second opening portion 75 is blocked up, and thereby the flow of the shaping material from the first opening portion 74 to the second opening portion 75 is regulated. Further, as shown in FIG. 5, when the flow rate regulating mechanism 73 rotates so that the recess portion 76 faces in the +X direction or the −X direction, the shaping material flows from the first opening portion 74 to the second opening portion 75 at a maximum flow rate. That is, the flow rate regulating mechanism 73 in this embodiment is configured as a butterfly valve.

The rotator 70 is a member in a cylindrical shape in which the fixed member 71 and the flow rate regulating mechanism 73 are internally disposed. The rotator 70 is coupled to a second driving portion 81 shown in FIG. 1. The second driving portion 81 is constituted by an actuator such as a stepping motor and rotates the rotator 70 around a rotation axis AX3 thereof according to the command from the controller 101. In this embodiment, the central axis AX1 of the through-hole 72, the central axis AX2 of the flow rate regulating mechanism 73, and the rotation axis AX3 of the rotator 70 coincide with one another. A fitting tolerance of the rotator 70 to the outer circumference of the fixed member 71 is, for example, fine roll fit or sliding fit, and the rotator 70 rotates so as to slide around the outer circumference of the fixed member 71.

The rotator 70 includes the first nozzle 61 and the second nozzle 62 at different positions on the outer circumference thereof. In this embodiment, the shape of the nozzle hole of the first nozzle 61 and the shape of the nozzle hole of the second nozzle 62 are both circular shapes, and a nozzle diameter R1 of the first nozzle 61 is smaller than a nozzle diameter R2 of the second nozzle 62. When the first nozzle 61 and the second nozzle 62 are viewed along the rotation axis AX3 of the rotator 70, an internal channel of the first nozzle 61 and an internal channel of the second nozzle 62 are more separated from each other as approaching the outer circumference of the rotator 70. The controller 101 switches the rotation state of the rotator 70 between a first state and a second state by controlling the rotation of the rotator 70 using the second driving portion 81. The first state refers to a state where the supply channel 65 and the first nozzle 61 communicate with each other and the supply channel 65 and the second nozzle 62 are shut off from each other. The second state refers to a state where the supply channel 65 and the second nozzle 62 communicate with each other and the supply channel 65 and the first nozzle 61 are shut off from each other. The state shown in FIG. 4 is a state that does not correspond to either of these states, and the state shown in FIG. 5 is the first state. In this embodiment, the first nozzle 61 and the second nozzle 62 are provided at different positions on the outer circumference of the rotator 70, and therefore, when the rotation state of the rotator 70 becomes the first state or the second state, the nozzle shutoff from the supply channel 65 moves to a position more distant from the table 210 than the nozzle communicating with the supply channel 65. Therefore, in the first state, the second nozzle 62 is located at a position more distant from the table 210 than the first nozzle 61, and in the second state, the first nozzle 61 is located at a position more distant from the table 210 than the second nozzle 62. The flow rate of the shaping material to be supplied to the first nozzle 61 or the second nozzle 62 from the supply channel 65 is regulated by the rotation state of the flow rate regulating mechanism 73 provided in the through-hole 72 as the supply channel 65.

As shown in FIG. 6, the suction portion 85 is coupled downstream of the flow rate regulating mechanism 73 in the supply channel 65. The suction portion 85 includes a suction channel 86 and a piston 87. The suction portion 85 is also referred to as "plunger". In this embodiment, the suction channel 86 communicates with the second opening portion 75. The piston 87 is disposed in the suction channel 86. The piston 87 is coupled to a third driving portion 82 shown in FIG. 1. The third driving portion 82 is constituted by a stepping motor and a rack and pinion mechanism or a ball screw mechanism, or the like, and makes the piston 87 perform translational motion in the suction channel 86. The controller 101 sucks the shaping material or supplies the shaping material to the second opening portion 75 from the second opening portion 75 that is a channel upstream of the first nozzle 61 or the second nozzle 62 by controlling the translational motion of the piston 87 using the third driving portion 82. When the controller 101 sucks the shaping material using the suction portion 85 in a state where the first nozzle 61 or the second nozzle 62 communicates with the second opening portion 75, the shaping material ejected from these nozzles is drawn in the nozzles, and therefore, tail cutting of the shaping material can be performed. In addition, by supplying the shaping material once drawn in the suction portion 85 to the second opening portion 75 from the suction portion 85, the shaping material can be supplied to the first nozzle 61 or the second nozzle 62 from the suction portion 85 faster than when the shaping material is supplied from the material melting portion 30.

As shown in FIG. 7, in this embodiment, a cutout portion 77 is provided so as to penetrate through a part of the outer circumferential portion of the rotator 70. The supply channel 65 is coupled to the fixed member 71 inside the rotator 70 through this cutout portion 77. That is, the rotator 70 includes the cutout portion 77 in a region which is a part of the outer circumferential portion of the rotator 70 and at which the supply channel 65 is introduced into the rotator 70. The cutout portion 77 is more largely cut out in the circumferential direction than in the coupling portion to the fixed member 71 of the supply channel 65. By the opening range of this cutout portion 77, the rotatable range of the rotator 70 is defined. That is, the rotator 70 can rotate with respect to the fixed member 71 within a range cut out by the cutout portion 77. As shown in FIG. 6, in this embodiment, the cutout portion 77 is separated from the first nozzle 61 and the second nozzle 62 in a direction along the rotation axis AX3 of the rotator 70. Therefore, the shaping material moving toward the first nozzle 61 or the second nozzle 62 can be prevented from leaking from the cutout portion 77 of the rotator 70.

Figure 8:
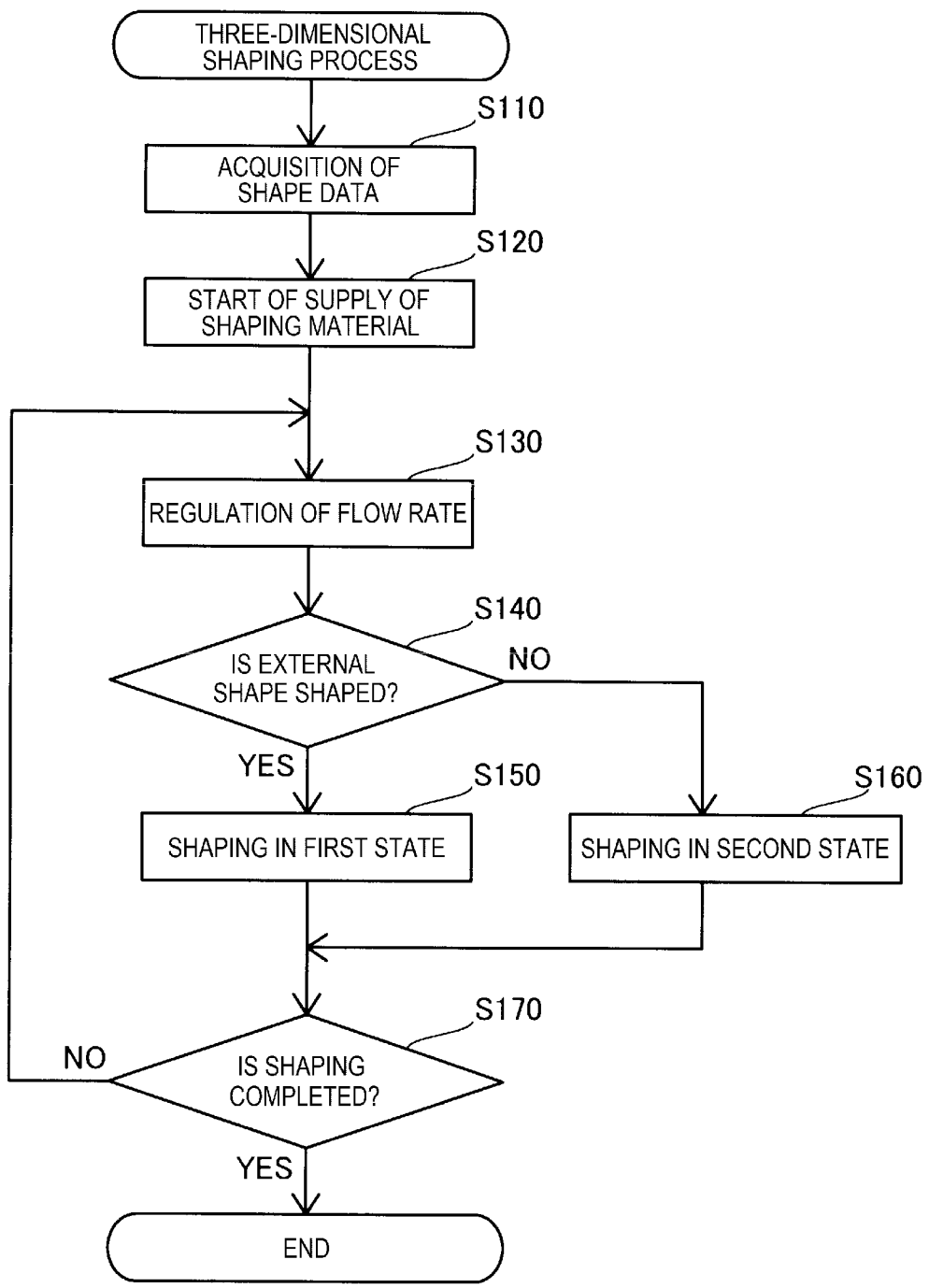
FIG. 8 is a flowchart of a process for realizing a three-dimensional shaped article production method.

FIG. 8 is a flowchart of a process for realizing a three-dimensional shaped article production method. This process is executed when a predetermined shaping start operation is performed by a user for an operation panel provided in the three-dimensional shaping apparatus 100 or a computer coupled to the three-dimensional shaping apparatus 100. First, the controller 101 acquires shape data of a three-dimensional shaped article in Step S110. The shape data are acquired from, for example, a computer coupled to the three-dimensional shaping apparatus 100 or a recording medium. At this time, the shape data are acquired as tool path data obtained by converting STL format or AMF format data representing the shape of the three-dimensional shaped article by a slicer. Subsequently, the controller 101 starts supply of the shaping material to the nozzle unit 60 in Step S120. Specifically, the material is melted by the material melting portion 30 to form the shaping material, and the formed shaping material is made to flow through the supply channel 65.

The controller 101 regulates the flow rate of the shaping material in the supply channel 65 by the flow rate regulating mechanism 73 in Step S130. In this embodiment, the controller 101 regulates the flow rate of the shaping material ejected according to the moving speed of the nozzle unit 60. For example, for a linear portion constituting the three-dimensional shaped article, the controller 101 increases the flow rate of the shaping material by controlling the flow rate regulating mechanism 73, and for a bent portion, the controller 101 decreases the flow rate of the shaping material by controlling the flow rate regulating mechanism 73. In this manner, the line width of the ejected shaping material can be made uniform.

The controller 101 determines whether a region of the three-dimensional shaped article to be shaped is an external shape in Step S140. The external shape refers to a region visible from the outside in a completed shape of the three-dimensional shaped article. A region of the three-dimensional shaped article other than the external shape is referred to as "internal shape". The controller 101 can determine whether a region of the three-dimensional shaped article to be shaped is an external shape by using, for example, the tool path data acquired in Step S110. A higher quality is required for the external shape than for the internal shape with respect to dimensional accuracy or surface roughness, and therefore, it is preferred to precisely shape the external shape by ejecting the shaping material from a nozzle with a small diameter. On the other hand, a higher quality is not required for the internal shape than for the external shape with respect to dimensional accuracy or surface roughness, and therefore, it is preferred to shape the internal shape in a short time by ejecting the shaping material from a nozzle with a large diameter.

When it was determined that the region of the three-dimensional shaped article to be shaped is the external shape in Step S140, the controller 101 shapes the three-dimensional shaped article in the first state where the shaping material is ejected from the first nozzle 61 with a small nozzle diameter by controlling the rotator 70 in Step S150. On the other hand, when it was not determined that the region of the three-dimensional shaped article to be shaped is the external shape in Step S140, the controller 101 shapes the three-dimensional shaped article in the second state where the shaping material is ejected from the second nozzle 62 with a large nozzle diameter by controlling the rotator 70 in Step S160. That is, the controller 101 performs shaping by switching the rotation state of the rotator 70 to the first state or the second state according to the region of the three-dimensional shaped article to be shaped.

After Step S150 or Step S160, the controller 101 determines whether the shaping of the three-dimensional shaped article was completed in Step S170. The controller 101 can determine whether the shaping of the three-dimensional shaped article was completed by using, for example, the tool path data acquired in Step S110. When it was not determined that the shaping of the three-dimensional shaped article was completed in Step S170, the controller 101 returns the process to Step S130 and continues the shaping of the three-dimensional shaped article. The controller 101 performs shaping of the internal shape of a first layer after shaping the external shape of a first layer of the three-dimensional shaped article. The controller 101 shapes a second layer on the first layer after shaping the first layer of three-dimensional shaped article. The controller 101 may shape the internal shape over a plurality of layers after shaping the external shape over a plurality of layers. In this manner, the controller 101 shapes the three-dimensional shaped article by stacking the shaping material. On the other hand, when it was determined that the shaping of the three-dimensional shaped article was completed in Step S170, the controller 101 terminates this process. When the ejection position of the shaping material is moved to a distant position during the above-mentioned shaping process, the controller 101 makes the suction portion 85 suck the shaping material in the suction channel 86. By sucking the shaping material in the suction channel 86, formation of a thread of the shaping material between the nozzle unit 60 and the three-dimensional shaped article can be suppressed even without stopping the rotation of the flat screw 40.

According to the three-dimensional shaping apparatus 100 of this embodiment described above, the first nozzle 61 and the second nozzle 62 are included in the rotator 70, and by rotating the rotator 70, in the first state where the shaping material is ejected from the first nozzle 61, the second nozzle 62 is located at a position more distant from the table 210 than the first nozzle 61, and in the second state where the shaping material is ejected from the second nozzle 62, the first nozzle 61 is located at a position more distant from the table 210 than the second nozzle 62. Therefore, while one of the nozzles is used, the other unused nozzle can be retracted to a position distant from the table 210. As a result, interference of the unused nozzle with the shaped article can be suppressed.

Further, in this embodiment, the rotator 70 includes the cutout portion 77, and the cutout portion 77 is separated from the first nozzle 61 and the second nozzle 62 in a direction along the rotation axis AX3 of the rotator 70. Therefore, the shaping material can be prevented from leaking from the cutout portion 77.

Further, in this embodiment, the nozzle diameter of the first nozzle 61 is smaller than the nozzle diameter of the second nozzle 62, and therefore, the shaping material with a different thickness between the first nozzle 61 and the second nozzle 62 can be ejected. Then, in this embodiment, when the external region of the three-dimensional shaped article is formed, the shaping material is ejected from the first nozzle 61 by switching the rotation state of the rotator 70 to the first state, and when the internal region of the three-dimensional shaped article is formed, the shaping material is ejected from the second nozzle 62 by switching the rotation state of the rotator 70 to the second state. Therefore, the shaping accuracy and the shaping speed of the three-dimensional shaped article can be improved.

Further, in the three-dimensional shaping apparatus 100 of this embodiment, the suction portion 85 is coupled downstream of the flow rate regulating mechanism 73 in the supply channel 65. Therefore, by sucking the shaping material from the nozzle unit 60, the ejection of the shaping material can be temporarily stopped.

Further, in this embodiment, the material melting portion 30 is constituted by the flat screw 40, and therefore, miniaturization of the three-dimensional shaping apparatus 100 can be achieved.

Here, materials of the three-dimensional shaped article to be used in the above-mentioned three-dimensional shaping apparatus 100 will be described. In the three-dimensional shaping apparatus 100, for example, the three-dimensional shaped article can be shaped by using various materials such as a material having thermoplasticity, a metal material, and a ceramic material as a main material. Here, the "main material" refers to a material mainly used for forming the shape of the three-dimensional shaped article and means a material whose content is 50 wt % or more in the three-dimensional shaped article. The above-mentioned shaping material includes a material obtained by melting such a main material singly or a material formed into a paste by melting a part of a component contained together with the main material.

When a material having thermoplasticity is used as the main material, the shaping material is formed by plasticization of the material in the material melting portion 30. The "plasticization" refers to melting by applying heat to the material having thermoplasticity.

As the material having thermoplasticity, for example, the following thermoplastic resin materials can be used.

Examples of Thermoplastic Resin Material general-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyether ether ketone In the material having thermoplasticity, a pigment, a metal, a ceramic, or other than these, an additive such as a wax, a flame retardant, an antioxidant, or a heat stabilizer, or the like may be mixed. The material having thermoplasticity is converted into a molten state by plasticization due to rotation of the flat screw 40 and heating by the heater 58 in the material melting portion 30. The shaping material formed by melting the material having thermoplasticity is cured by decreasing the temperature after being ejected from the nozzle unit 60.

The material having thermoplasticity is desirably injected from the nozzle unit 60 in a completely molten state by being heated to a temperature not lower than the glass transition point thereof. For example, an ABS resin has a glass transition point of about 120° C. and the temperature thereof when it is ejected from the nozzle unit 60 is desirably about 200° C. In order to eject the shaping material in a high temperature state in this manner, a heater may be provided around the nozzle unit 60.

In the three-dimensional shaping apparatus 100, in place of the above-mentioned material having thermoplasticity, for example, the following metal material may be used as the main material. In this case, it is desirable that a component melting when forming the shaping material is mixed in a powder material obtained by pulverizing the following metal material, and the resulting material is fed to the material melting portion 30 as the material MR.

Examples of Metal Material single metals such as magnesium (Mg), iron (Fe), cobalt (Co), chromium (Cr), aluminum (Al), titanium (Ti), copper (Cu), and nickel (Ni), or alloys containing one or more of these metals Examples of Alloy a maraging steel, stainless steel, cobalt-chromium-molybdenum, a titanium alloy, a nickel alloy, an aluminum alloy, a cobalt alloy, and a cobalt-chromium alloy In the three-dimensional shaping apparatus 100, in place of the above-mentioned metal material, a ceramic material can be used as the main material. As the ceramic material, for example, an oxide ceramic such as silicon dioxide, titanium dioxide, aluminum oxide, or zirconium oxide, a non-oxide ceramic such as aluminum nitride, or the like can be used. When a metal material or a ceramic material as described above is used as the main material, the shaping material disposed in the table 210 may be cured by sintering.

The powder material of the metal material or the ceramic material to be fed to the material supply portion 20 as the material MR may be a mixed material obtained by mixing a plurality of types of single metal powders or alloy powders or ceramic material powders. Further, the powder material of the metal material or the ceramic material may be coated with, for example, a thermoplastic resin as exemplified above or a thermoplastic resin other than those exemplified above. In this case, the material may be configured to exhibit fluidity by melting the thermoplastic resin in the material melting portion 30.

To the powder material of the metal material or the ceramic material to be fed to the material supply portion 20 as the material MR, for example, a solvent as described below can also be added. As the solvent, one type or a combination of two or more types selected from the following solvents can be used.

Examples of Solvent water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl n-butyl ketone, diisopropyl ketone, and acetyl acetone, alcohols such as ethanol, propanol, and butanol, tetra-alkyl ammonium acetates, sulfoxide-based solvents such as dimethyl sulfoxide and diethyl sulfoxide, pyridine-based solvents such as pyridine, γ-picoline, and 2,6-lutidine, tetra-alkyl ammonium acetates (for example, tetra-butyl ammonium acetate, etc.), ionic liquids such as butyl carbitol acetate, and the like In addition thereto, for example, a binder as described below can also be added to the powder material of the metal material or the ceramic material to be fed to the material supply portion 20 as the material MR.

Examples of Binder an acrylic resin, an epoxy resin, a silicone resin, a cellulosic resin, or other synthetic resins, or PLA (polylactic acid), PA (polyamide), PPS (polyphenylene sulfide), PEEK (polyether ether ketone), or other thermoplastic resins B. Second Embodiment In the above-mentioned first embodiment, the shape of the nozzle hole of the first nozzle 61 and the shape of the nozzle hole of the second nozzle 62 are both circular shapes. On the other hand, the nozzle hole of the first nozzle 61 and the nozzle hole of the second nozzle 62 may have different shapes.

Figure 9:
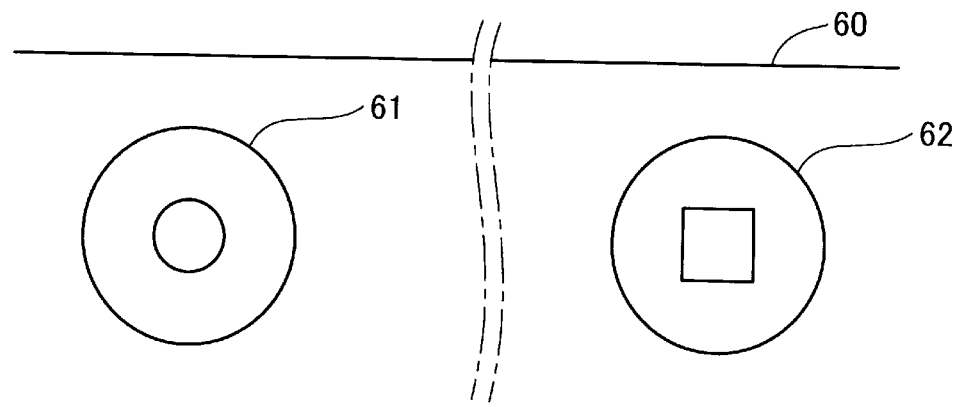
FIG. 9 is a view showing shapes of nozzle holes in a second embodiment.

FIG. 9 is a view showing shapes of the respective nozzle holes of the first nozzle 61 and the second nozzle 62 in a second embodiment. In FIG. 9, a state where the respective nozzles are viewed from a lower side is simply shown. In this embodiment, the shape of the nozzle hole of the first nozzle 61 is a circular shape, and the shape of the nozzle hole of the second nozzle 62 is a quadrangular shape. Therefore, the shaping material with a different cross-sectional shape between the first nozzle 61 and the second nozzle 62 can be ejected. Further, when the shape of the nozzle hole is a quadrangular shape, a gap between the stacked shaping materials can be made small. Therefore, for example, a change in volume of the shaped article can be suppressed by shaping the external shape of the shaped article using the first nozzle 61 with a circular shape, and shaping the internal shape using the second nozzle 62 with a quadrangular shape.

C. Third Embodiment

Figure 10:
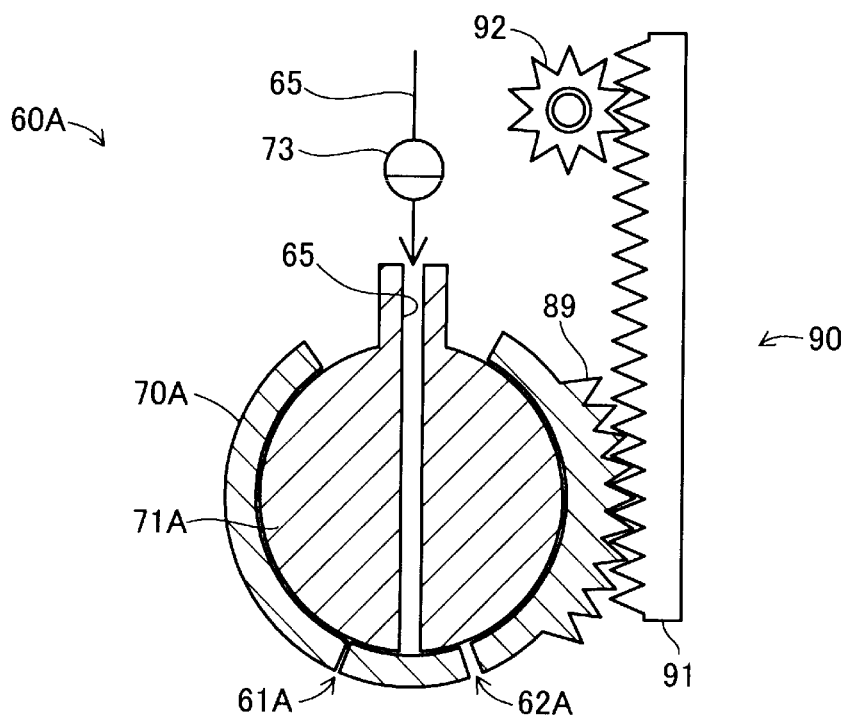
FIG. 10 is a view showing a schematic configuration of a nozzle unit in a third embodiment.
Figure 11:
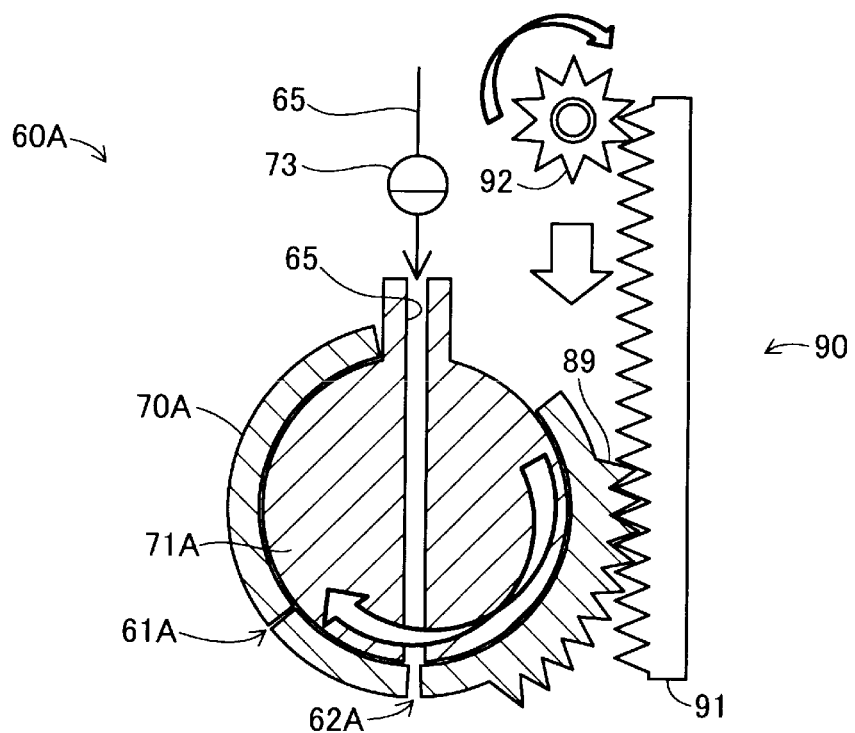
FIG. 11 is a view showing a schematic configuration of the nozzle unit in the third embodiment.
Figure 12:
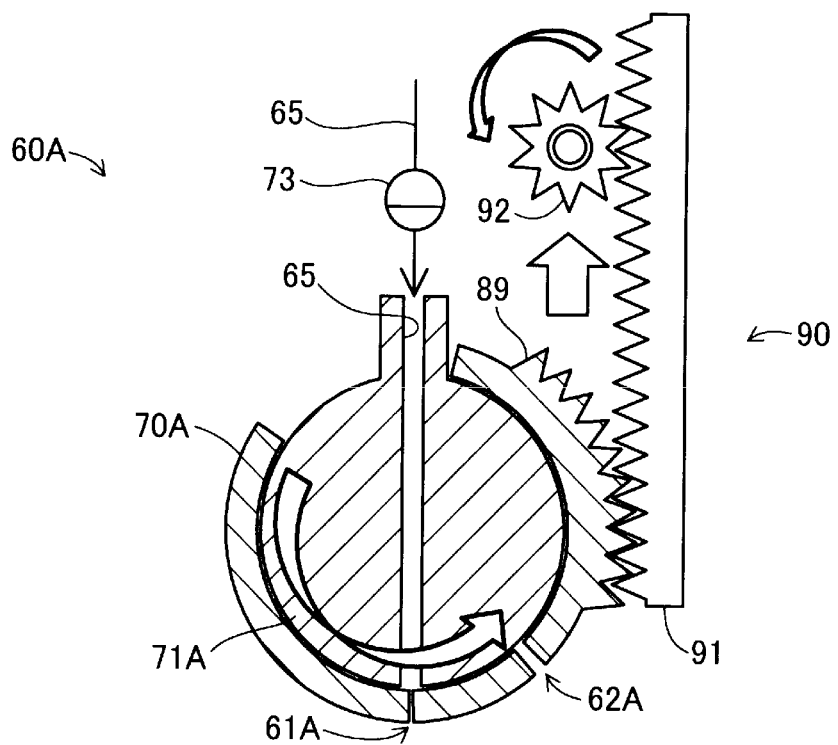
FIG. 12 is a view showing a schematic configuration of the nozzle unit in the third embodiment.

FIGS. 10 to 12 are each a view showing a schematic configuration of a nozzle unit 60A in a third embodiment. In this embodiment, in the nozzle unit 60A, a rotator 70A is disposed at an outer circumference of a fixed member 71A in a circular shape having a supply channel 65 internally formed along the vertical direction. In the supply channel 65 upstream of the fixed member 71A, a flow rate regulating mechanism 73 is provided. In a part of the circumference of the rotator 70A, a gear 89 is formed, and a rack 91 of a rack and pinion mechanism 90 rotating the rotator 70A is engaged with the gear 89. A pinion gear 92 is attached to a stepping motor constituting a second driving portion 81 shown in FIG. 1. In the rotator 70A, a first nozzle 61A and a second nozzle 62A are provided at different positions on the outer circumference thereof. Even in such a configuration, the first nozzle 61A and the second nozzle 62A are provided at different positions on the outer circumference of the rotator 70A, and therefore, interference of the unused nozzle of these nozzles with the shaped article can be suppressed.

D. Fourth Embodiment

Figure 13:
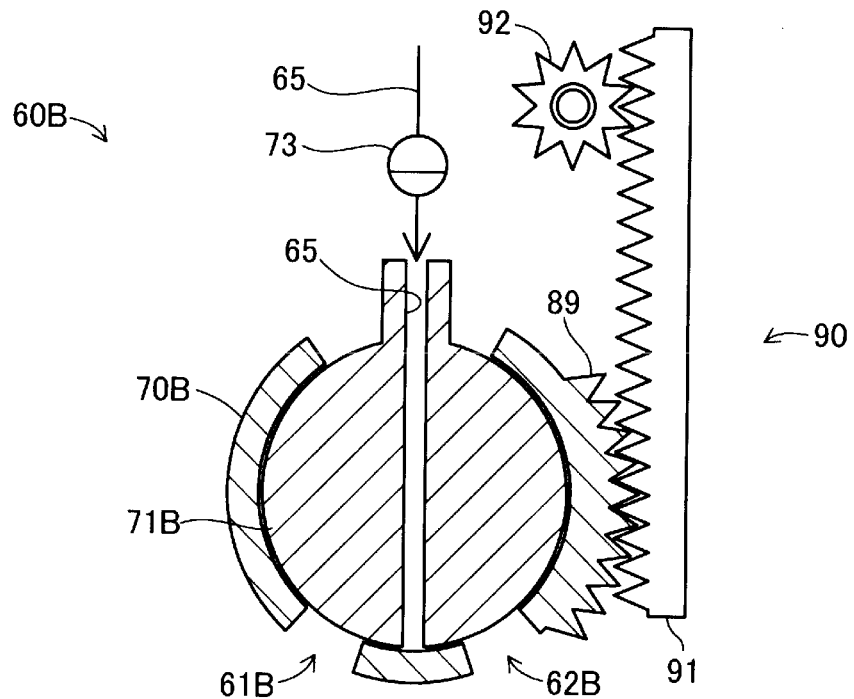
FIG. 13 is a view showing a schematic configuration of a nozzle unit in a fourth embodiment.
Figure 14:
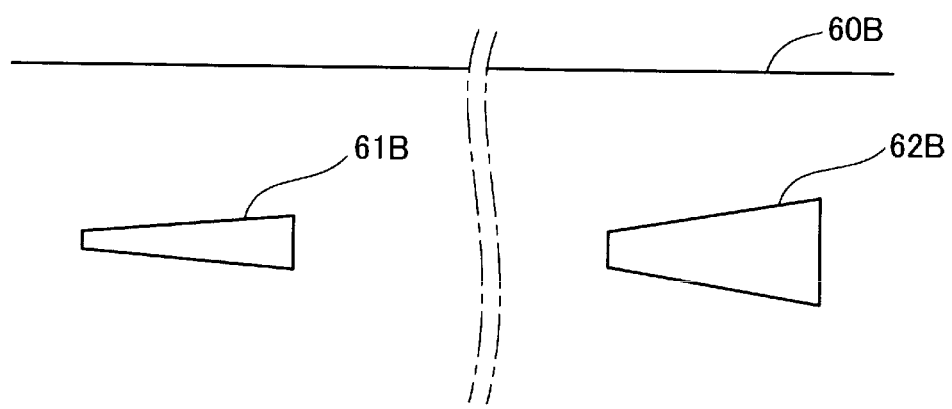
FIG. 14 is a view showing shapes of nozzle holes in the fourth embodiment.

FIG. 13 is a view showing a schematic configuration of a nozzle unit 60B in a fourth embodiment. FIG. 14 is a view showing shapes of the respective nozzle holes of a first nozzle 61B and a second nozzle 62B in the fourth embodiment. In FIG. 14, a state where the respective nozzles are viewed from a lower side is simply shown. The nozzle unit 60B of this embodiment is different from the nozzle unit 60A of the third embodiment in the shape of the nozzle. As shown in FIGS. 13 and 14, in this embodiment, the shapes of the first nozzle 61B and the second nozzle 62B are each a shape whose width continuously changes in a circumferential direction of a rotator 70B. In the example shown in FIG. 14, both the first nozzle 61B and the second nozzle 62B have a width gradually increasing in a direction directed from the first nozzle 61B to the second nozzle 62B, and the increasing ratio of the width of the second nozzle 62B is larger than that of the first nozzle 61B. If the nozzle holes have such shapes, by controlling the rotation state of the rotator 70B, the amount of the shaping material to be ejected from each nozzle hole can be regulated according to an overlapping state of the outlet of the supply channel 65 and the nozzle hole in the rotator 70B. The shapes of the first nozzle 61B and the second nozzle 62B may not both be the shapes shown in FIGS. 13 and 14, and one of them may be another shape such as a circular shape of a quadrangular shape.

E. Other Embodiments (E-1) The three-dimensional shaping apparatus 100 of the above-mentioned embodiment may not include the suction portion 85. Even in such a configuration, ejection of the shaping material and stopping of the ejection can be controlled by controlling the flow rate regulating mechanism 73.

(E-2) In the above-mentioned embodiment, the nozzle diameter of the first nozzle 61 and the nozzle diameter of the second nozzle 62 may be the same diameter. According to this configuration, even if one of the nozzles is clogged, shaping of a shaped article can be continued by using the other nozzle.

(E-3) The three-dimensional shaping apparatus 100 is not limited to an apparatus configured to plasticize the material by the flat screw 40. For example, the three-dimensional shaping apparatus 100 may be an apparatus configured to plasticize the material not by the flat screw 40 but by rotation of an in-line screw.

(E-4) In the above-mentioned embodiment, the three-dimensional shaping apparatus 100 includes two nozzles. On the other hand, the three-dimensional shaping apparatus 100 may include three or more nozzles on the outer circumference of the rotator 70.

(E-5) In the above-mentioned embodiment, the ejection of the shaping material from the nozzle unit 60 can be stopped by shutting off the supply of the shaping material to the nozzle unit 60 from the material melting portion 30 using the flow rate regulating mechanism 73. On the other hand, the ejection of the shaping material may be stopped by setting the rotation position of the rotator 70 to a position shown in FIG. 4 or 10 so as to bring the supply channel 65 into a state where it does not communicate with either of the first nozzle 61 and the second nozzle 62. In addition, the ejection of the shaping material may be stopped by using both the flow rate regulating mechanism 73 and the rotator 70.

F. Other Aspects

The present disclosure is not limited to the above-mentioned respective embodiments, but can be realized in various aspects without departing from the gist thereof. For example, the present disclosure can be realized in the following aspects. The technical features in the above-mentioned respective embodiments corresponding to technical features in the respective aspects described below may be appropriately replaced or combined for solving part or all of the problems of the present disclosure or achieving part or all of the effects of the present disclosure. Further, the technical features may be appropriately deleted unless they are described as being essential in the present specification.

(1) According to a first aspect of the present disclosure, a three-dimensional shaping apparatus is provided. This three-dimensional shaping apparatus includes a material melting portion melting a material to form a shaping material, a supply channel through which the shaping material flows, a rotator that is configured to rotate around a rotation axis and that has a first nozzle configured to communicate with the supply channel and a second nozzle configured to communicate with the supply channel, a flow rate regulating mechanism that is provided in the supply channel and that regulates a flow rate of the shaping material to be supplied to the first nozzle or the second nozzle, and a controller controlling the flow rate regulating mechanism and the rotator so as to eject the shaping material to a table from the first nozzle or the second nozzle, thereby shaping a three-dimensional shaped article, wherein the controller controls rotation of the rotator so as to switch between a first state where the supply channel and the first nozzle communicate with each other and the supply channel and the second nozzle are shut off from each other and a second state where the supply channel and the second nozzle communicate with each other and the supply channel and the first nozzle are shut off from each other, and in the first state, the second nozzle is located at a position more distant from the table than the first nozzle, and in the second state, the first nozzle is located at a position more distant from the table than the second nozzle.

According to such an aspect, in the first state where the supply channel and the first nozzle communicate with each other, the second nozzle is located at a position more distant from the table than the first nozzle, and in the second state where the supply channel and the second nozzle communicate with each other, the first nozzle is located at a position more distant from the table than the second nozzle, and therefore, while one of the nozzles is used, the other unused nozzle can be retracted to a position distant from the table. As a result, interference of the unused nozzle with the shaped article can be suppressed.

(2) In the three-dimensional shaping apparatus of the above aspect, the rotator may include a cutout portion defining a rotatable range of the rotator in a region which is a part of an outer circumferential portion of the rotator and at which the supply channel is introduced into the rotator, and the cutout portion may be separated from the first nozzle and the second nozzle in a direction along the rotation axis. According to such an aspect, the cutout portion defining a rotatable range of the rotator is separated from each nozzle in a direction along the rotation axis of the rotator, and therefore, the shaping material can be prevented from leaking from the cutout portion.

(3) In the three-dimensional shaping apparatus of the above aspect, a nozzle diameter of the first nozzle may be smaller than a nozzle diameter of the second nozzle. According to such an aspect, the shaping material with a different thickness between the first nozzle and the second nozzle can be ejected.

(4) In the three-dimensional shaping apparatus of the above aspect, the controller may switch a rotation state of the rotator to the first state when an external region of the three-dimensional shaped article is formed, and may switch the rotation state of the rotator to the second state when an internal region of the three-dimensional shaped article is formed. According to such an aspect, the external region of the three-dimensional shaped article can be formed using the first nozzle with a small nozzle diameter, and the internal region of the three-dimensional shaped article can be formed using the second nozzle with a large nozzle diameter, and therefore, the shaping accuracy and the shaping speed of the three-dimensional shaped article can be improved.

(5) In the three-dimensional shaping apparatus of the above aspect, a shape of a nozzle hole of the first nozzle may be different from a shape of a nozzle hole of the second nozzle. According to such an aspect, the shaping material with a different cross-sectional shape between the first nozzle and the second nozzle can be ejected.

(6) In the three-dimensional shaping apparatus of the above aspect, at least one of a shape of a nozzle hole of the first nozzle and a shape of a nozzle hole of the second nozzle may be a shape whose width continuously changes in a circumferential direction of the rotator. According to such an aspect, the thickness of the shaping material to be ejected from the nozzle hole can be regulated according to an overlapping state of the nozzle hole and the supply channel.

(7) The three-dimensional shaping apparatus of the above aspect may include a suction portion that is coupled downstream of the flow rate regulating mechanism in the supply channel, and that sucks the shaping material in the supply channel. According to such an aspect, by sucking the shaping material in the supply channel by the suction portion, the ejection of the shaping material from the nozzle can be temporarily stopped.

(8) In the three-dimensional shaping apparatus of the above aspect, the material melting portion may include a flat screw having a groove formed face in which a groove portion is formed, and a barrel that has an opposed face opposed to the groove formed face of the flat screw, that has a communication hole formed in the opposed face, and that includes a heater, and the material melting portion may melt at least a part of the material by rotation of the flat screw and heating by the heater to form the shaping material and make the shaping material flow out to the supply channel from the communication hole. According to such an aspect, miniaturization of the three-dimensional shaping apparatus can be achieved.

(9) According to a second aspect of the present disclosure, a three-dimensional shaped article production method is provided. This production method includes melting a material by a material melting portion to form a shaping material, making the shaping material flow through a supply channel, and controlling a rotator that is configured to rotate around a rotation axis and that has a first nozzle configured to communicate with the supply channel and a second nozzle configured to communicate with the supply channel, and a flow rate regulating mechanism that is provided in the supply channel and that regulates a flow rate of the shaping material to be supplied to the first nozzle or the second nozzle so as to eject the shaping material to a table from the first nozzle or the second nozzle while switching a rotation state of the rotator between a first state where the supply channel and the first nozzle communicate with each other and the supply channel and the second nozzle are shut off from each other and a second state where the supply channel and the second nozzle communicate with each other and the supply channel and the first nozzle are shut off from each other, thereby shaping a three-dimensional shaped article, wherein in the first state, the second nozzle is located at a position more distant from the table than the first nozzle, and in the second state, the first nozzle is located at a position more distant from the table than the second nozzle.

According to such an aspect, in the first state where the supply channel and the first nozzle communicate with each other, the second nozzle is located at a position more distant from the table than the first nozzle, and in the second state where the supply channel and the second nozzle communicate with each other, the first nozzle is located at a position more distant from the table than the second nozzle, and therefore, while one of the nozzles is used, the other unused nozzle can be retracted to a position distant from the table. As a result, interference of the unused nozzle with the shaped article can be suppressed.

The present disclosure is not limited to the three-dimensional shaping apparatus or the three-dimensional shaped article production method described above and can also be realized in various aspects. For example, it can be realized in aspects of a three-dimensional shaping apparatus controlling method, a computer program for shaping a three-dimensional shaped article, a non-temporary tangible recording medium recording a computer program, etc.

What is claimed is:

1. A three-dimensional shaping apparatus, comprising:
   a material melting portion melting a material to form a shaping material;
   a supply channel through which the shaping material flows;
   a rotator that is configured to rotate around a rotation axis and that has a first nozzle configured to communicate with the supply channel and a second nozzle configured to communicate with the supply channel, wherein
      the rotator further includes a cutout portion defining a rotatable range of the rotator in a region which is a part of an outer circumferential portion of the rotator and at which the supply channel is introduced into the rotator, and
      the cutout portion is separated from the first nozzle of the rotator and the second nozzle of the rotator in a direction along the rotation axis of the rotator;
   a flow rate regulating mechanism that is provided in the supply channel and that regulates a flow rate of the shaping material to be supplied to the first nozzle or the second nozzle; and
   a controller controlling the flow rate regulating mechanism and the rotator so as to eject the shaping material to a table from the first nozzle or the second nozzle, thereby shaping a three-dimensional shaped article, wherein
      a center axis of the flow rate regulation mechanism coincides with the rotation axis of the rotator,
      the controller controls rotation of the rotator so as to switch between a first state where the supply channel and the first nozzle communicate with each other and the supply channel and the second nozzle are shut off from each other and a second state where the supply channel and the second nozzle communicate with each other and the supply channel and the first nozzle are shut off from each other, and
      in the first state, the second nozzle is located at a position more distant from the table than the first nozzle, and
      in the second state, the first nozzle is located at a position more distant from the table than the second nozzle.

2. The three-dimensional shaping apparatus according to claim 1, wherein a nozzle diameter of the first nozzle is smaller than a nozzle diameter of the second nozzle.

3. The three-dimensional shaping apparatus according to claim 2, wherein the controller switches a rotation state of the rotator to the first state when an external region of the three-dimensional shaped article is formed, and switches the rotation state of the rotator to the second state when an internal region of the three-dimensional shaped article is formed.

4. The three-dimensional shaping apparatus according to claim 1, wherein a shape of a nozzle hole of the first nozzle is different from a shape of a nozzle hole of the second nozzle.

5. The three-dimensional shaping apparatus according to claim 1, wherein at least one of a shape of a nozzle hole of the first nozzle and a shape of a nozzle hole of the second nozzle is a shape whose width continuously changes in a circumferential direction of the rotator.

6. The three-dimensional shaping apparatus according to claim 1, comprising a suction portion that is coupled downstream of the flow rate regulating mechanism in the supply channel, and that sucks the shaping material in the supply channel.

7. The three-dimensional shaping apparatus according to claim 1, wherein
the material melting portion includes:
a flat screw having a groove formed face in which a groove portion is formed; and
a barrel that has an opposed face opposed to the groove formed face of the flat screw, that has a communication hole formed in the opposed face, and that includes a heater, and
the material melting portion melts at least a part of the material by rotation of the flat screw and heating by the heater to form the shaping material and makes the shaping material flow out to the supply channel from the communication hole.

8. A three-dimensional shaped article production method, comprising:
melting a material by a material melting portion to form a shaping material;
making the shaping material flow through a supply channel;
controlling a rotator that is configured to rotate around a rotation axis and that has a first nozzle configured to communicate with the supply channel and a second nozzle configured to communicate with the supply channel, wherein
the rotator further includes a cutout portion defining a rotatable range of the rotator in a region which is a part of an outer circumferential portion of the rotator and at which the supply channel is introduced into the rotator, and
the cutout portion is separated from the first nozzle of the rotator and the second nozzle of the rotator in a direction along the rotation axis of the rotator; and
controlling a flow rate regulating mechanism that is provided in the supply channel and that regulates a flow rate of the shaping material to be supplied to the first nozzle or the second nozzle so as to eject the shaping material to a table from the first nozzle or the second nozzle while switching a rotation state of the rotator between a first state where the supply channel and the first nozzle communicate with each other and the supply channel and the second nozzle are shut off from each other and a second state where the supply channel and the second nozzle communicate with each other and the supply channel and the first nozzle are shut off from each other, thereby shaping a three-dimensional shaped article, wherein
a center axis of the flow rate regulation mechanism coincides with the rotation axis of the rotator,
in the first state, the second nozzle is located at a position more distant from the table than the first nozzle, and
in the second state, the first nozzle is located at a position more distant from the table than the second nozzle.

* * * * *